Figure 1:
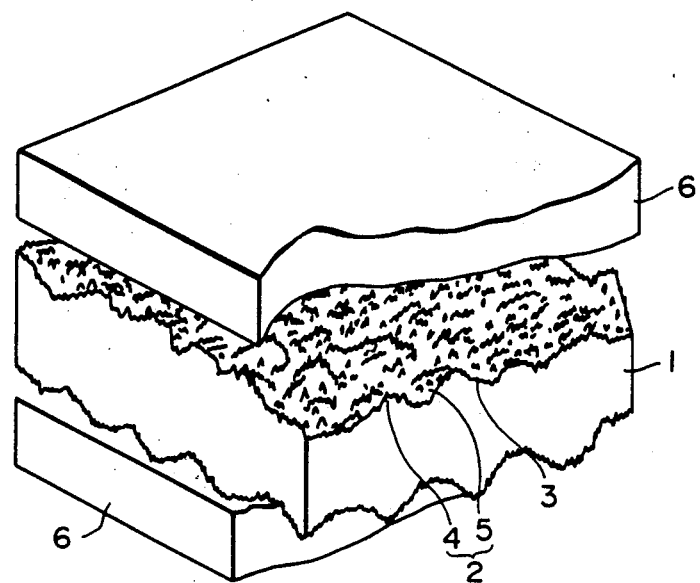

United States Patent [19]
Endo et al.

[11] Patent Number: 4,925,725
[45] Date of Patent: May 15, 1990

[54] INTERLAYER FOR LAMINATED GLASS

[75] Inventors: Gen Endo, Moriyama; Hiroyuki Tateishi, Ohmihachiman; Yoshihiro Kawata, Hino; Isao Karasudani, Ohtsu; Hirofumi Omura, Kusatsu, all of Japan

[73] Assignee: Sekisui Kagaku Kogyo Kabushiki Kaisha, Osaka, Japan

[21] Appl. No.: 293,579

[22] Filed: Jan. 4, 1989

Related U.S. Application Data

[63] Continuation of Ser. No. 780,822, Sep. 27, 1985, abandoned.

[51] Int. Cl.$^5$ .................................................. B32B 3/00
[52] U.S. Cl. .................................. 428/156; 428/220; 428/437
[58] Field of Search .................... 428/156, 437, 220

[56] References Cited

U.S. PATENT DOCUMENTS

| | | | |
|---|---|---|---|
| 4,035,549 | 7/1977 | Kennar | 428/426 |
| 4,112,166 | 9/1978 | Chyu | 428/437 |
| 4,331,503 | 5/1982 | Benjamin | 156/633 |
| 4,452,840 | 6/1984 | Sato et al. | 428/437 |
| 4,546,029 | 10/1985 | Cancio et al. | 428/156 |

Primary Examiner—Pamela R. Schwartz
Attorney, Agent, or Firm—Wenderoth, Lind & Ponack

[57] ABSTRACT

An interlayer for a laminated glass, said interlayer being composed of a film or sheet of a thermoplastic resin, at least one surface of the film or sheet of a thermoplastic resin having numerous coarse raised and depressed portions and numerous fine raised and depressed portions existing on the surfaces of the coarse raised and depressed portions, the average distance between two adjacent coarse depressed or raised portions being about 2 to about 10 times the 10-point average roughness of the coarse raised and depressed portions measured in accordance with ISO-R468.

4 Claims, 1 Drawing Sheet

U.S. Patent

May 15, 1990

4,925,725

INTERLAYER FOR LAMINATED GLASS

This application is a continuation of now abandoned application Ser. No. 780,822, filed Sept. 27, 1985.

This invention relates to an improved interlayer for a laminated glass used in various transportation facilities such as automobiles and aircraft and windowpanes of buildings.

The laminated glass is produced generally by holding an interlayer of a film or sheet of, for example, plasticized polyvinyl butyral with two glass sheets to build an assembly, removing air from the inside of the assembly under reduced pressure by using a rubber bag, etc., preliminarily press-bonding the constituents of the assembly, and then consolidating it in an autoclave to form a unitary structure. Raised and depressed portions of various shapes are formed on one or both surfaces of the interlayer to improve deaeration in the preliminary pressbonding step and prevent blocking of the interlayer, as disclosed, for example, in Japanese Laid-Open Patent Publication No. 150532/1982. So far, however, no interlayer film has been obtained which is satisfactory both in deaeratability and antiblocking property.

It is an object of this invention to provide an interlayer film or sheet for a laminated glass, which has excellent deaeratability in the press-bonding and consolidating steps, improved antiblocking property and moderate adhesion to glass.

The present invention provides an interlayer for a laminated glass, which is composed of a film or sheet of a thermoplastic resin, at least one surface of the film or sheet of a thermoplastic resin having numerous coarse raised and depressed portions and numerous fine raised and depressed portions existing on the surfaces of the coarse raised and depressed portions, the average distance between two adjacent coarse depressed or raised portions being about 2 to about 10 times the 10-point average roughness of the coarse raised and depressed portions measured in accordance with ISO-R468.

In a preferred embodiment of this invention, the average distance between the two adjacent coarse raised or depressed portions is 100 to 500 micrometers, preferably 200 to 300 micrometers, and the 10-point average roughness of the coarse raised and depressed portions is 200 to 100 micrometers, preferably 25 to 70 micrometers.

The surface roughness of the fine raised and depressed portions formed on the surfaces of the coarse raised and depressed portions, and the distance between adjacent fine raised or depressed portions are selected within proper ranges depending mainly upon the roughness of the coarse raised and depressed portions, and the material and properties of the thermoplastic resin. Usually, the surface roughness of the fine raised and depressed portions, determined by the 10-point average roughness, is 5 to 20 micrometers, preferably 5 to 15 micrometers.

When the average roughness of the coarse raised and depressed portions is relatively small, it is desirable to make the surface roughness of the fine raised and depressed portions relatively small. Preferably, the ratio of the surface roughness of the fine raised and depressed portions to the surface roughness of the coarse raised and depressed portions is in the range of from 0.2 to 0.5. The average distance between two adjacent fine raised or depressed portions is preferably 60 to 130 micrometers, more preferably 60 to 100 micrometers.

Figure 2:
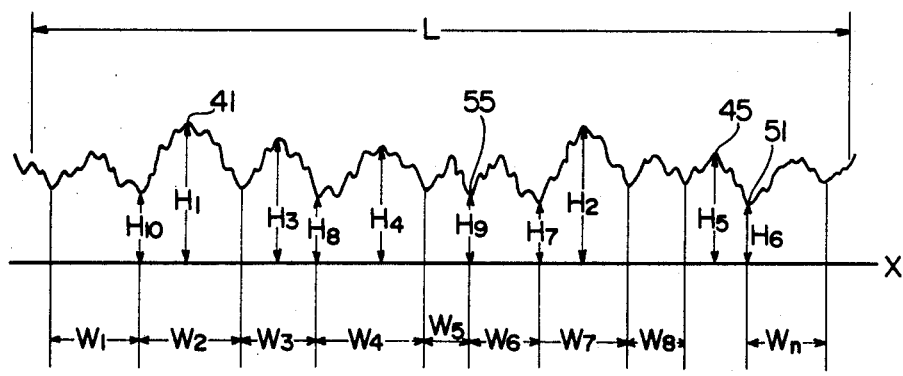

The invention is described below in detail with reference to the accompanying drawings in which:

FIG. 1 is a partly broken-away perspective view, drawn in a slightly exaggerated manner, showing the state of the interlayer of the invention being held by glass sheets; and FIG. 2 is a surface roughness curve of the interlayer of the invention at a certain position drawn in a slightly exaggerated manner.

With reference to FIG. 1, numerous coarse raised portions 4 and depressed portions 5 (inclusively designated by 2) are formed on both surfaces of an interlayer 1, and numerous fine raised and depressed portions 3 are formed on the surfaces of the coarse raised and depressed portions 2, and the surfaces of the interlayer 2 have double raised and depressed areas.

Preferably, a depressed portion 5 of the coarse raised and depressed portion 2 is directly connected to the depressed portion 5 of the adjacent raised and depressed portion 2, as shown in the drawing. If desired, the depressed portions 5,5 of the adjacent raised and depressed portions 2,2 may be connected through a flat portion. In the latter case, the area of the flat portion is preferably minimized in order to increase the antiblocking property of the interlayer.

In the illustrated embodiment, the coarse raised and depressed portions are arranged irregularly on the surface of the interlayers, but if desired, they may be arranged regularly. If further desired, the coarse raised portions may be connected in a long line in one direction to form ridges, and a narrow channel may be formed between adjacent ridges. In this case, however, it is necessary to remove air during laminated glass production in a direction nearly corresponding to such a narrow channel.

Referring to FIG. 2 showing a surface roughness curve of the interlayer 1 at a certain position measured by using the needle contacting method.

The average distance of adjacent coarse raised or depressed portions is measured, for example, as an average of distance between the bottoms of the adjacent coarse depressed portions. Let us consider the surface roughness curve of FIG. 2 with respect to a part having a standard length L. Let the distance between the bottoms of two adjacent depressed portions be Wi (where i is an integer of 1 to n, and n+1 is the number of the bottoms of depressed portions existing in the standard length L), then the average distance W is given by the following equation.

$$W = \sum_{i=1}^{n} Wi/n$$

The standard length L is assumed to be 8 mm.

The roughness of the coarse raised and depresssed portions is expressed by the 10-point average roughness in accordance with ISO-R468 of International Organization for Standardization, and determined as follows:

In the curve shown in FIG. 2 obtained by the needle contacting method with respect to the standard length L, the 10-point average roughness H is defined as the average of the heights of five ridges from the highest ridge 41 to the fifth highest ridge 45 minus the average of the depths of 5 valleys from the deepest valley 51 to the 5th deepest valley 55. Hence, in FIG. 2, H is calculated in accordance with the following equation.

$$H = \frac{(H_1 + H_2 + H_3 + H_4 + H_5) - (H_6 + H_7 + H_8 + H_9 + H_{10})}{5}$$

$H_1$ to $H_{10}$ represents the height or depth of a ridge or valley measured from the reference line X.

The standard length L is determined according to the degree of the surface roughness, but in the present invention, it is set at 8 mm.

In the present invention, W and H are selected so that the average distance W of the coarse raised and depressed portions is about 2 to about 10 times the 10-point average roughness H.

If the average distance W is less than 2 times the average roughness H, air tends to remain during preliminary press-bonding of glass sheets 6, 6 and the interlayer 1, and therefore, foams tend to occur in the laminated glass obtained by the subsequent consolidating operation. If the average distance W exceeds 10 times the average roughness H, the interlayer blocks, or its adhesion to the glass is too strong, and the operability of laminate glass production is reduced.

The 10-point average roughness of the fine raised and depressed portions is measured after the coarse raised and depressed portions (also called undulations) are removed from the surface (sectional) curve shown in FIG. 2. Removal of the coarse raised and depressed portions from the sectional curve is carried out generally by using a filter circuit used in an electrical surface roughness tester, or by utilizing the locus of the center of a circle having a large radius of curvature obtained when the sectional curve is traced with the circle. The method using a filter circuit is preferred. Most of needle-contacting type surface roughness testers now in use are adapted to electrically amplifying the movement of a contact needle, and the aforesaid filter circuit is usually built within the testers. One example of the surface roughness test containing a filter circuit built therein is Surfcom 1210A (a contact needle type surface roughness tester made by Toyo Seimitsui Kabushiki Kaisha).

In the present invention, it is preferred to employ 0.08 mm as the length of cutoff in the filter circuit in accordance with Japanese Industrial Standard, JIS B-601-1976.

Examples of the thermoplastic resin used to form the interlayer in accordance with this invention include polyvinyl butyral, polyurethane, ethylene/vinyl acetate copolymer, ethylene/vinyl acetate/vinyl alcohol copolymer, and ethylene/methyl methacrylate copolymer. For use in automobile laminated glass, the use of plasticized polyvinyl butyral is preferred.

The interlayer of this invention may have various known additives, such as ultraviolet absorbers, antioxidants, coloring agents and adhesiveness adjusting agents, contained therein or adhering thereto. For various end usages, the thickness of the interlayer is preferably in the range of 0.1 to 2.0 mm.

The interlayer film or sheet having a double raised and depressed pattern may be produced by using an embossing roll method, a calender roll method, an irregular-shape extruding method, or a mechanical etching method. The emboss roll method is preferred. According to the emboss roll method, emboss rolls having raised and depressed portions corresponding to the raised and depressed portions to be formed on the surface of the interlayer film or sheet are used as press-forming rolls in the production of the interlayer.

In the formation of the double raised and depressed pattern on an embossing roller used for the production of the interlayer of the present invention, it is preferred to use an engraving method for the formation of coarse raised and depressed portions and a blasting method for the formation of fine raised and depressed portions. According to the engraving method, the desired pattern is engraved on a mother roll, and the pattern on the mother roll is transferred under pressure to the surface of a roll to be produced. According to the blasting method, a particulate blasting material is blown against the surface of a roll at a high speed. The blasting material is, for example, Alundum (artificially fused alumina), emery and steel grids obtained by crushing steel shots. Emery is preferred.

Since the engraving method can give raised and depressed portions having a relatively uniform and stable configuration or roughness, it is useful in forming coarse raised and depressed portions which impart deaeratability to the interlayer. According to the blasting method, nonuniform but relatively steep raised and depressed portions can be obtained, and therefore it is useful for forming fine raised and depressed portions which impart antiblocking property to the interlayer.

A laminated glass containing the interlayer of this invention may be produced usually by holding the interlayer between an inorganic glass sheet and an inorganic glass sheet or between an inorganic glass sheet and an organic glass sheet composed of a transparent rigid resin such as a polycarbonate resin or an acrylic resin, and removing air from the inside of the assembly by placing it in a rubber bag or by using nip rolls and squeezing it between the rolls to preliminarily press-bond the constituents of the assembly, and thereafter consolidating it at high temperatures and pressures in an autoclave. As a result, a transparent laminated glass can be obtained.

The preferred embodiments and advantages of this invention are illustrated by the following Examples and Comparative Examples.

In the following examples, the antiblocking property of the interlayer film or sheet and the foaming of the laminated glass by heating were measured by the following methods.

(1) Antiblocking property

The interlayer was cut into pieces having a size of 100 mm×25 mm. Two pieces were laminated and a load of 2 kg was placed on the laminate. It was left to stand at room temperature for 24 hours. Then, the laminate was subjected to a 180 degree peel test at a pulling speed of 200 mm/min. The average (three replicates) of the peeling forces was calculated, and defined as a measure of antiblocking property.

The larger the value, the higher the adhesion strength between the film pieces, and therefore the worse the operability of laminated glass production.

(2) Foaming

The interlayer was held between two inorganic glass sheets, and the resulting assembly was passed through a heating oven. The surface temperature of the heated laminate was adjusted, and air was removed from inside the assembly by a squeezing method using nip rolls to perform preliminary press-bonding.

The laminated product was then consolidated in a pressurizing device at a pressure of 13 kg/cm² and a temperature of 130° C. Then the temperature was lowered to 50° C., and the pressure was gradually lowered to atmospheric pressure. Ten such laminated glasses were placed in a Geer's oven, and heated at 120° C. for 2 hours. The number of laminated glasses in which the remaining air became foams was counted.

using this interlayer was also examined. The results are shown in Table 1.

TABLE 1

| | | Example 1 | | | Example 2 | | | Example 3 | | | Comparative Example 1 | | | Comparative Example 2 | | |
|---|---|---|---|---|---|---|---|---|---|---|---|---|---|---|---|---|
| Surface configuration | 10-point average roughness, H, of the coarse raised and depressed portions (micrometers) | 35 | | | 60 | | | 65 | | | 35 | | | 80 | | |
| | Average distance, W, of the coarse raised or depressed portions (micrometers) | 175 | | | 200 | | | 250 | | | 175 | | | 130 | | |
| | W/H | 5 | | | 3.3 | | | 3.8 | | | 5 | | | 1.6 | | |
| | 10-point average roughness of the fine raised and depressed portions (micrometers) | 8 | | | 8 | | | 12 | | | None | | | None | | |
| Antiblocking property (g/2.5 cm) | | 90 | | | 75 | | | 71 | | | 230 | | | 140 | | |
| Preliminary pressing temperature (°C.) | | 70 | 80 | 90 | 70 | 80 | 90 | 70 | 80 | 90 | 70 | 80 | 90 | 70 | 80 | 90 |
| Foaming of the laminated glass (number) | | 0/10 | 0/10 | 0/10 | 0/10 | 0/10 | 0/10 | 0/10 | 0/10 | 0/10 | 0/10 | 0/10 | 0/10 | 5/10 | 3/10 | 3/10 |

EXAMPLE 1

An interlayer film of plasticized polyvinyl butyral was prepared in a customary manner from 100 parts by weight of polyvinyl butyral and 40 parts of triethylene glycol di-2-ethylbutyrate. By using embossing rolls, a double raised and depressed pattern consisting of irregularly arranged coarse raised and depressed portions and fine raised and depressed portions formed on the surfaces of the coarse raised and depressed portions was formed on both surfaces of the interlayer film. The 10-point average roughness of the coarse raised and depressed portions was 35 micrometers, and the average distance between adjacent coarse raised or depressed portions was 5 times the 10-point average roughness. The configuration of the coarse raised or depressed portions was therefore gentle. The 10-point average surface roughness of the fine raised and depressed portions was 8 micrometers.

The antiblocking property of this interlayer film at room temperature and the foaming of a laminated glass produced by using the interlayer film are shown in Table 1.

EXAMPLES 2-3

In the same way as in Example 1, interlayer films having double raised and depressed patterns were produced. The configurations of the raised and depressed portions and the properties of the interlayer films and laminated glasses are shown in Table 1.

COMPARATIVE EXAMPLE 1

In the same way as in Example 1, an interlayer film having a raised and depressed pattern without fine raised and depressed portions as shown in Table 1 was produced by using an embossing roll. The antiblocking property of this interlayer film and the foaming of a laminated glass are shown in Table 1.

COMPARATIVE EXAMPLE 2

A commercial plasticized polyvinyl butyral interlayer film having steel raised portions and deep depressed portions on both surfaces was examined for the shapes of the raised and depressed portions and properties. The foaming of a laminated glass produced by using this interlayer was also examined. The results are shown in Table 1.

In the interlayer of this invention, the average distance between adjacent coarse raised or depressed portions is about 2 to about 10 times the average roughness of the coarse raised and depressed portions and no deep valley nor steep ridge exists. Accordingly, air does not remain in a step of holding the interlayer with glass sheets and performing deaeration, and consequently, a laminated glass free from foams can be obtained.

Since fine raised and depressed portions are further formed on the surfaces of the coarse raised and depressed portions in the interlayer of this invention, the interlayer has good antiblocking property and does not excessively adhere to glass sheets, the operability of the laminated glass production is improved and the number of laminated glasses which can be stored in the stacked state increases.

Since the interlayer of this invention has the foreskin double raised and depressed pattern on its surface, the raised portions are easily collapsed at the time of preliminary press-bonding step, the line speed of the preliminarily press-bonding step can be increased.

What is claimed is:

1. An interlayer for a laminated glass, said interlayer having a thickness of 0.1 to 2.0 mm. and being composed of a film or sheet of a thermoplastic resin, at least one surface of the film or sheet of a thermoplastic resin having numerous coarse raised and depressed portions and numerous fine raised and depressed portions existing on the surfaces of the coarse raised and depressed portions, the average distance between two adjacent coarse expressed or raised portions being about 2 to about 10 times the 10-point average roughness of the coarse raised and depressed portions measured in accordance with ISO-R468, wherein said interlayer is produced by using an embossing roll as a press-forming roll, said embossing roll having on its surface coarse raised and depressed portions formed by an engraving method and fine raised and depressed portions formed by a blasting method.

2. The interlayer of claim 1 wherein the average distance is 100 to 500 micrometers, and the 10-point average roughness is 20 to 100 micrometers.

3. The interlayer of claim 2 wherein the average distance is 200 to 300 micrometers, and the 10-point average roughness is 25 to 70 micrometers.

4. The interlayer of claim 1 wherein the 10-point average roughness of the fine raised and depressed portions is 5 to 20 micrometers.

* * * * *